*(12)* United States Patent
Singh et al.

*(10)* Patent No.: US 10,333,996 B2
*(45)* Date of Patent: Jun. 25, 2019

(54) METHODS AND SYSTEMS FOR ANALYZING STREAMING MEDIA SESSIONS

(71) Applicant: CALLSTATS I/O Oy, Helsinki (FI)

(72) Inventors: Varun Singh, Helsinki (FI); Jörg Ott, Munich (DE)

(73) Assignee: CALLSTATS I/O OY, Helsinki (FI)

( * ) Notice: Subject to any disclaimer, the term of this patent is extended or adjusted under 35 U.S.C. 154(b) by 321 days.

(21) Appl. No.: 15/293,428

(22) Filed: Oct. 14, 2016

(65) Prior Publication Data

US 2018/0109565 A1 Apr. 19, 2018

(51) Int. Cl.
*G06F 15/173* (2006.01)
*H04L 29/06* (2006.01)
*H04L 12/26* (2006.01)
*H04L 29/08* (2006.01)
*H04L 12/24* (2006.01)

(52) U.S. Cl.
CPC ...... *H04L 65/1066* (2013.01); *H04L 41/5009* (2013.01); *H04L 43/06* (2013.01); *H04L 43/08* (2013.01); *H04L 43/0852* (2013.01); *H04L 43/12* (2013.01); *H04L 65/60* (2013.01); *H04L 67/26* (2013.01)

(58) Field of Classification Search
CPC ......... H04L 29/06884; H04L 43/00–12; H04L 41/50–5025; H04L 41/5032–5038; H04L 65/1066
See application file for complete search history.

(56) References Cited

U.S. PATENT DOCUMENTS

| | | | |
|---|---|---|---|
| 7,076,547 B1 | 7/2006 | Black | |
| 8,958,318 B1 | 2/2015 | Hastwell | |
| 9,106,887 B1* | 8/2015 | Owen | H04N 19/102 |
| 9,363,209 B1* | 6/2016 | Akins, III | H04L 49/9078 |
| 2003/0086422 A1* | 5/2003 | Klinker | H04L 29/06 370/389 |
| 2004/0066753 A1 | 4/2004 | Grovenburg | |

(Continued)

OTHER PUBLICATIONS

Extended European Search Report for EP 17188130.3-1862; dated Oct. 26, 2017.

*Primary Examiner* — Brendan Y Higa
(74) *Attorney, Agent, or Firm* — Ziegler IP Law Group, LLC.

(57) ABSTRACT

A method for analyzing a streaming media session between at least two communicating entities includes at least one media stream having at least two packets communicated between the communicating entities during the streaming media session. At least two monitoring entities are configured to record a plurality of observations pertaining to at least one of: the media stream, the packets, devices associated with at least one of the communicating entities, wherein the monitoring entities include at least one of a network entity forwarding the media stream between the communicating entities. Observations are received from the monitoring entities, and processed to obtain a plurality of pre-processed observations. The pre-processed observations are analyzed to determine a session quality. A notification is sent to at least one of the monitoring entities during the streaming media session, if the session quality satisfies at least one quality criterion.

17 Claims, 3 Drawing Sheets

(56) References Cited

U.S. PATENT DOCUMENTS

| | | | |
|---|---|---|---|
| 2004/0073690 A1* | 4/2004 | Hepworth | H04L 29/06 709/230 |
| 2004/0136327 A1 | 7/2004 | Sitaraman | |
| 2005/0204052 A1* | 9/2005 | Wang | H04L 29/06027 709/231 |
| 2006/0268700 A1* | 11/2006 | Clark | H04L 29/06027 370/230 |
| 2008/0031145 A1* | 2/2008 | Ethier | H04L 29/06027 370/248 |
| 2009/0167520 A1* | 7/2009 | Watanabe | H04L 41/064 340/507 |
| 2011/0243001 A1* | 10/2011 | Yang | H04M 3/085 370/252 |
| 2012/0170761 A1* | 7/2012 | Ozawa | H04L 43/028 381/56 |
| 2013/0067109 A1 | 3/2013 | Dong | |
| 2013/0100859 A1* | 4/2013 | Martin | H04M 15/48 370/259 |
| 2014/0006612 A1* | 1/2014 | Fallon | H04L 41/065 709/224 |
| 2014/0029462 A1* | 1/2014 | Stewart | H04L 43/06 370/252 |
| 2014/0136690 A1* | 5/2014 | Jain | H04L 41/5012 709/224 |
| 2015/0295775 A1* | 10/2015 | Dickey | H04L 41/22 715/735 |
| 2016/0226731 A1* | 8/2016 | Maroulis | H04L 43/065 |
| 2017/0250882 A1* | 8/2017 | Kellicker | H04L 43/08 |

* cited by examiner

METHODS AND SYSTEMS FOR ANALYZING STREAMING MEDIA SESSIONS

TECHNICAL FIELD

The present disclosure relates to methods for analyzing a streaming media session between at least two communicating entities. Moreover, the present disclosure relates to systems for analyzing a streaming media session between at least two communicating entities.

BACKGROUND

Communication services are increasingly being provided over data communication networks and especially the Internet today. The communication services are becoming richer in functionality with respect to:
- the diversity of media (from a single medium to multimedia),
- the fidelity of media (from a low quality to a higher quality for at least one of the multiple types of media),
- the number of entities involved in a communication (from two to many),
- the duration of the communication (from a few minutes to hours or even days), and
- the context of the communication (from a dedicated phone using a specific apparatus to software applications running on a multi-purpose device, for example, such as a computer, to being embedded in another software application).

These communication services are increasingly gaining broader acceptance, as more diverse services are being offered, the number of service providers is growing, and the number of users is also growing, and hence the number of calls is growing.

While the growth in rich communication over data communication networks, such as the Internet, places increasing demands on the capacity (performance), the reliability, and the flexibility of the data communication networks, the Internet has not been built with considerations of such advanced applications in mind (which occurred only decades after its inception).

As a result, developers and providers of the aforesaid communication services (namely, Communications Service Provider; CSP) have been facing a requirement to:
- design their systems and services in a manner that would allow operation in an unknown and unpredictable networking environment having no guarantees,
- design their systems and services in a manner that would allow operation in a dynamically changing environment, where changes could be due to:
  - other communication services being active at the same time,
  - changes in the network load as a result of commencing and/or terminating of other calls,
  - changes in the network load as a result of their own actions (and other reactions to their actions),
  - changes in a network topology and the network capacity due to mobility or node failures or interference of external forces with elements of wired or wireless communication networks,
  - physical properties of a channel being used, for example, for wireless communication networks, and
  - user mobility, for example, such as change in location, velocity, and so forth (which, in turn, may affect the channel).

In such an unpredictable and dynamically changing network environment with a variety of communication services, there arises a need for the CSPs to be able to measure the quality of their service to identify and mend bottlenecks in their service infrastructure.

There exist techniques for analysing streaming media distribution and determining multimedia call performance. Conventionally, software may be written to monitor throughput, packet loss and other networking parameters that affect perceived performance of a call. However, from an end-to-end distribution point of view, it is better to identify the bottleneck or the source of problem in the network elements/paths/connections, so that it can potentially be remedied. This can be done by identifying a particular session and collecting time-stamped information related to jitter, packet loss, etc. in potentially every network node for that particular session. Such performance statistics collection is available for endpoints (see link: http:www-.callstats.io/2015/07/06/basics-webrtc-getstats-api/).

However, the performance in the endpoints does not tell where the problem is in the data communication network. While packet streams related to a communication session can be identified and information can thus be observed and collected, there is a problem in finding a correlation in the collected information, which is to be used to identify the source of the problem.

Moreover, conventionally, the information collection and processing is performed "off-line", namely after the communication session is over.

Furthermore, collecting and processing such information on packet data networks easily results in a huge amount of data. This makes it impractical to correlate the collected information, as a large amount of computational resources, namely memory and processing capability, is required to process such a huge amount of data.

SUMMARY

The present disclosure seeks to provide an improved method for analyzing a streaming media session between at least two communicating entities.

The present disclosure also seeks to provide an improved system for analyzing a streaming media session between at least two communicating entities.

A further aim of the present disclosure is to at least partially overcome at least some of the problems of the prior art, as discussed above.

In a first aspect, embodiments of the present disclosure provide a method for analyzing a streaming media session between at least two communicating entities, wherein at least one media stream comprising at least two packets is communicated between the at least two communicating entities during the streaming media session, the method comprising:
(a) configuring at least two monitoring entities to record a plurality of observations pertaining to at least one of: the at least one media stream, the at least two packets, devices associated with at least one of the at least two communicating entities, wherein the at least two monitoring entities comprise at least one of: at least one network entity forwarding the at least one media stream between the at least two communicating entities, the at least one of the at least two communicating entities;
(b) receiving, from the at least two monitoring entities, the plurality of observations;
(c) processing the plurality of observations to obtain a plurality of pre-processed observations;

(d) analyzing the plurality of pre-processed observations to determine a session quality; and (e) sending at least one notification to at least one of the at least two monitoring entities, if the session quality satisfies at least one quality criterion, wherein the at least one notification is sent during the streaming media session.

In a second aspect, embodiments of the present disclosure provide a system for analyzing a streaming media session between at least two communicating entities, wherein at least one media stream comprising at least two packets is communicated between the at least two communicating entities during the streaming media session, the system comprising a server arrangement that is operable to:

(a) configure at least two monitoring entities to record a plurality of observations pertaining to at least one of: the at least one media stream, the at least two packets, devices associated with at least one of the at least two communicating entities, wherein the at least two monitoring entities comprise at least one of: at least one network entity forwarding the at least one media stream between the at least two communicating entities, the at least one of the at least two communicating entities;

(b) receive, from the at least two monitoring entities, the plurality of observations;

(c) process the plurality of observations to obtain a plurality of pre-processed observations;

(d) analyze the plurality of pre-processed observations to determine a session quality; and (e) send at least one notification to at least one of the at least two monitoring entities, if the session quality satisfies at least one quality criterion, wherein the at least one notification is sent during the streaming media session.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
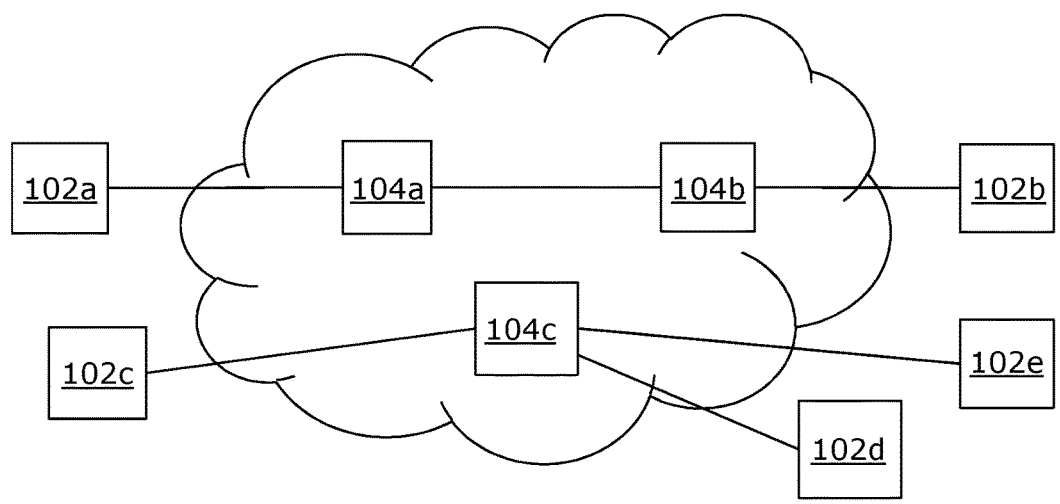
FIGS. 1A and 1B collectively are a schematic illustration of a network environment, wherein a system for analyzing a streaming media session between at least two communicating entities is implemented pursuant to embodiments of the present disclosure.

In the accompanying drawings, an underlined number is employed to represent an item over which the underlined number is positioned or an item to which the underlined number is adjacent.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

Glossary

Brief definitions of terms used throughout the present disclosure are given below.

The terms "call" or "conference" generally refer to any one of:

an interaction between two or more user entities over a data communication network in which the user entities exchange information of at least one medium (modality), an interaction between at least one user and at least one automated entity, or an interaction between two or more automated entities.

The interaction during a call may occur synchronously (namely, simultaneously for all involved entities) or asynchronously (namely, in a time-shifted manner). Throughout the present disclosure, the terms "call" and "conference" have been used interchangeably.

The term "medium" generally refers to any one of:

a digital representation of audio or speech data or audible noise, a digital representation of video or sequences of still image data, a digital representation of written text, still image, drawings, or other information, a digital representation of measured instantaneous physical properties, for example including, but not limited to, brightness, temperature, velocity, acceleration, position, direction, presence or composition of chemical substances (for example, such as air, water and so forth), a digital representation of computer-generated properties (for example, such as virtual environments) as, for example, in games or simulations, or a digital representation of instructions to be carried out in a physical or a virtual or a composite environment.

Notably, media may comprise discrete or continuous contents, or a combination of both. Media content is optionally transmitted as one or more data units encapsulated in Internet Protocol (IP) packets (namely, IPv4 and IPv6). Those skilled in the art will appreciate that other communication protocols, including, but not limited to, cellular networks, information-centric networks, may be used to carry such data units.

The term "media stream" generally refers to a flow of packets that represent media content. A media stream comprises a plurality of packets being transmitted via a data communication network, wherein the plurality of packets share one or more common properties (for example, such as source and destination addresses).

The term "streaming media session" generally refers to a communication session in which participating entities communicate media streams therebetween.

The term "packet" generally refers to a data packet that is communicated from a given transmitting entity to a given receiving entity. The term "packet" encompasses both media packets as well as non-media packets.

A media packet comprises media of at least one type. Optionally, a media packet comprises at least one of: audio data, video data, image data. Audio, video, and other types of media may be conveyed within a same media packet, or may be spread across different media packets.

On the other hand, a non-media packet is a control packet that is optionally exchanged between two communicating entities as a part of a media stream. Zero, one, or more non-media packets are exchanged between the two communicating entities, possibly in each direction. Such non-media packets are optionally used to determine whether or not the two communicating entities can communicate with each other via a given data communication network. It is to be noted here that non-media packets can be exchanged at the beginning of a streaming media session as well as during the streaming media session, namely can precede as well as be interspersed with media packets.

The term "set of parameters" generally refers to a set of parameters associated with a given streaming media session, wherein the set of parameters is used to identify packets in a media stream being monitored during the given streaming media session.

The term "user entity" generally refers to a functional entity (for example, such as an executed software program) operating on behalf of and interacting with a local (namely, co-located) user to allow the user to establish media communication with at least one other entity. An example of a user entity is a web browser running on a user device and executing program instructions of a multimedia (namely, audio/video) communication endpoint. Another example of a user entity is a dedicated application or "App" running on a user device and executing program instructions of a multimedia communication endpoint.

The term "automated entity" generally refers to a functional entity that operates automatically, without any intervention by a local user. An automated entity may be a source or a sink of packets, or an intermediary between two other entities. An automated entity may also process (for example, combine, replicate, transform and so forth) and interpret the packets received thereat. Examples of an automated entity include, but are not limited to, a conference server, a video server, a voice recorder, a voice mailbox, an Interactive Voice-Response (IVR) unit, a callbot, a unit processing media, a unit forwarding media, a unit replicating media, and a unit terminating media received from another entity. In some implementations, an automated entity could be a source of media, for example, such as a microphone, a camera or other types of sensors that are configured to measure properties (for example, such as temperature, acceleration, and so forth).

The term "communicating entity" generally refers to an entity that sources and/or sinks one or more media streams. A communicating entity could be a user entity or an automated entity that is communicating with another entity.

The term "network entity" generally refers to a functional entity that neither sources nor sinks media streams, but forwards media streams. Such forwarding may include address translation.

The term "monitoring entity" generally refers to an entity that records observations pertaining to media streams. A monitoring entity is typically a logical function that may be implemented in hardware, software, firmware or a combination thereof, and that may be co-located with any one of: a user entity, an automated entity, or a network entity. A monitoring entity may record observations independently or in cooperation with functions of its co-located entity. The monitoring entity may also store data of the observations recorded thereat.

The term "reporting entity" generally refers to an entity that collects data of observations from other entities (namely, monitoring entities or other report entities) in a hierarchical manner. A reporting entity may process and/or store the collected data. The reporting entity may forward the collected data or the processed data or the stored data to another reporting entity or an analytics and control entity. Optionally, a reporting entity is implemented by way of a separate server.

The term "analytics and control entity" generally refers to an entity that controls other entities (for example, tells monitoring entities which calls to monitor, with what kind of parameters, and so on).

The term "device clock" encompasses an Operating System (OS) clock or a hardware clock associated with a given entity.

The term "marker" generally refers to a parameter whose value increases in a monotonic manner. Optionally, a marker is a packet sequence number that is assigned by a transmitting entity to each packet originating therefrom, wherein packet sequence numbers are assigned in a monotonically-increasing manner. Alternatively, optionally, a marker is a time stamp that is assigned by a transmitting entity to each packet originating therefrom; the time stamp is not related to an absolute device clock associated with the transmitting entity, but is media-related. Such media-related time stamps are not required to be strictly monotonically increasing, but are monotonically increasing only within a time period that is substantially longer than a round trip delay between the transmitting entity and a given receiving entity.

The term "marker-line" is analogous to the term "timeline". On a marker-line, markers are arranged in an ascending order of their values. Optionally, when packet sequence numbers are used as markers, the marker-line is a series of packet sequence numbers assigned by a given transmitting entity. Likewise, optionally, when media-related time stamps are used as markers, the marker-line is a series of media-related time stamps assigned by a given transmitting entity.

The term "server" generally refers to an application, program, process or device in a client/server relationship that responds to requests for information or services by another application, program, process or device (namely, a client) on a communication network. The term "server" also encompasses software that makes the act of serving information or providing services possible.

The term "client" generally refers to an application, program, process or device in a client/server relationship that requests information or services from another application, program, process or device (namely, a server) on a communication network. Importantly, the terms "client" and "server" are relative since an application may be a client to one application but a server to another application. The term "client" also encompasses software that makes the connection between a requesting application, program, process or device and a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based upon the present disclosure provided herein, one of ordinary skill in the art will appreciate a variety of ways in which connection or coupling exists in accordance with the aforementioned definition.

The terms "first", "second", and the like, herein do not denote any order, quantity, or importance, but rather are used to distinguish one element from another. Furthermore, the terms "a" and "an" herein do not denote a limitation of quantity, but rather denote the presence of at least one of the referenced item.

The phrases "in an embodiment", "in accordance with an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

EMBODIMENTS OF THE PRESENT DISCLOSURE

In a first aspect, embodiments of the present disclosure provide a method for analyzing a streaming media session between at least two communicating entities, wherein at least one media stream comprising at least two packets is communicated between the at least two communicating entities during the streaming media session, the method comprising:
(a) configuring at least two monitoring entities to record a plurality of observations pertaining to at least one of: the at least one media stream, the at least two packets, devices associated with at least one of the at least two communicating entities, wherein the at least two monitoring entities comprise at least one of: at least one network entity forwarding the at least one media stream between the at least two communicating entities, the at least one of the at least two communicating entities;
(b) receiving, from the at least two monitoring entities, the plurality of observations;
(c) processing the plurality of observations to obtain a plurality of pre-processed observations;
(d) analyzing the plurality of pre-processed observations to determine a session quality; and
(e) sending at least one notification to at least one of the at least two monitoring entities, if the session quality satisfies at least one quality criterion, wherein the at least one notification is sent during the streaming media session.

Optionally, the method is implemented by way of a server arrangement comprising at least one server that is configured to perform (a) to (e).

The server arrangement is coupled in communication with the at least two monitoring entities via a data communication network. The data communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks, community networks, satellite networks, vehicular networks, sensor networks, and Worldwide Interoperability for Microwave Access (WiMAX) networks. Such networks may run the Internet Protocol (IP), an information-centric protocol, or other protocols to achieve a desired data communication.

Moreover, the at least two communicating entities are communicably coupled with each other via the data communication network.

The at least two communicating entities comprise at least one user entity. Examples of the devices associated with the at least one of the at least two communicating entities include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, and large-sized touch screens with embedded PCs. Some specific examples of such devices include, but are not limited to, iPhone®, iPad®, Android® phone, Android® web pad, Windows® phone, and Windows® web pad.

Optionally, the at least two communicating entities comprise at least one automated entity.

Optionally, in the method, the server arrangement receives the plurality of observations from the at least two monitoring entities, via at least one reporting entity. Optionally, in this regard, the plurality of observations are received via reports from different entities. Such reports can comprise complete or partial data of the plurality of observations, raw or processed data of the plurality of observations, or any combination thereof.

Optionally, the plurality of observations comprise observations that require urgent analysis, and therefore, are sent for analysis in real time.

Optionally, the data of the plurality of observations is compressed using at least one data compression method prior to reporting to another entity that is at a higher hierarchical level. As an example, Robust Header Compression (ROHC) can be used to compress the data of the plurality of observations.

Optionally, the different entities are configured to send the reports on a regular basis. Alternatively, optionally, the different entities are configured to send the reports on an event-driven basis. As an example, observations are sent more frequently when transient disruptions occur. Yet alternatively, optionally, the different entities are configured to send the reports at varying intervals. As an example, observations are sent more frequently towards a beginning of the streaming media session than towards an end of the streaming media session. More optionally, the varying intervals are dynamically adjusted.

Moreover, optionally, the method comprises selecting the at least one reporting entity to be used for collecting the data of the plurality of observations. Optionally, in this regard, the at least one reporting entity is selected based upon computational load of the at least one reporting entity and/or a proximity of the at least one reporting entity to the at least two monitoring entities.

For illustration purposes only, there will now be considered a simplified example of a hierarchy between monitoring entities, reporting entities and an analytics and control entity. One such example has been illustrated in conjunction with FIG. 2 as explained in more detail below.

In the illustrated example, there will now be considered that user entities 'UE1', 'UE2', 'UE3' and 'UE4' are communicating in a conference call. UE1 and UE2 are communicating via a network entity 'NE1' on an Internet Service Provider (ISP) 'A', while UE3 and UE4 are communicating via network entities 'NE2' and 'NE3', respectively, on another ISP 'B'. The conference call is being executed on a conference server, namely an automated entity 'AE1'.

In the example, there will now be considered that each of the user entities, the network entities and the automated entity are configured to act as monitoring entities.

An analytics and control entity 'ACE' is operable to select which reporting entities to use for collecting data of observations recorded at the monitoring entities. In the example, UE1, UE2 and NE1 send their observations to a reporting entity 'RE1', while UE3, UE4, NE2, NE3 and AE1 send their observations to another reporting entity 'RE2'. Subsequently, RE1 and RE2 send the data of the observations to ANE, either directly or via other reporting entities.

Moreover, optionally, the method further comprises:
(f) receiving, from the at least one of the at least two communicating entities, a set of parameters associated with the streaming media session, wherein the set of parameters uniquely identifies the streaming media session; and
(g) using the set of parameters to identify the at least two packets being communicated during the streaming media session.

Optionally, in this regard, the at least one of the at least two communicating entities is configured to send the set of parameters to the server arrangement when the streaming media session is setup. Optionally, the configuring of the at least one of the at least two communicating entities is implemented by way of at least one of:
(i) software libraries that are integrated in the devices associated with the at least one of the at least two communicating entities,
(ii) software plugins or extensions that are installed at the devices to extend the functionality of existing browser applications,
(iii) stand-alone software applications that are installed at the devices,
(iv) firmware integration.

Optionally, the configuring of the at least one network entity is implemented by way of at least one of:
(i) software libraries that are integrated in network devices associated with the at least one network entity,
(ii) stand-alone software applications that are installed at the network devices,
(iii) firmware integration.

It will be appreciated that a frequency at which a given monitoring entity monitors and records observations can be constant or can change over time. Optionally, the frequency is configured by another entity, for example, such as at least one server of the server arrangement that acts as an analytics and control entity. Alternatively, optionally, the frequency is varied automatically within upper and lower bounds defined by the at least one server. More optionally, the frequency is varied as a function of at least one of:

(i) a storage space available for storing the observations,
(ii) quality metrics observed for the streaming media session (for example, such as a bit rate, a loss rate, and so on),
(iii) an observed load of a reporting entity to which the given monitoring entity reports,
(iv) an observed network load of a path between the given monitoring entity and the reporting entity,
(v) a rule set provided by the reporting entity,
(vi) a rule set that is determined based upon information and/or instructions provided by the reporting entity.

It will also be appreciated that when the at least one network entity acts as a monitoring entity, the at least one network entity observes the at least two packets "on the wire". In other words, a communicating entity involved in the streaming media session has full access to all bits of each packet, namely after decryption or prior to encryption, whereas a network entity may have only limited access to data contained in the at least two packets, namely access to data contained in unencrypted parts (for example, packet headers) of these packets.

Moreover, it will be appreciated that at the at least one network entity, a given packet is optionally identified by a quintuple comprising an Internet Protocol (IP) address of a source of the given packet, an IP address of a destination of the given packet, a source port number, a destination port number, and a transport protocol. For multimedia, the transport protocol is usually, but not necessarily, the User Datagram Protocol (UDP). Optionally, apart from the quintuple, the given packet further comprises a flow label or other identifiers to signify quality of service demands, for example, a differentiated services code point. Additionally, optionally, the given packet is further distinguished by its payload type or a unique identifier of its source. Notably, at the at least one of the at least two communicating entities, the identification of the given packet is simple, as a software application responsible for sourcing and sinking packets is assumed to use defined functions.

Optionally, the set of parameters associated with the streaming media session comprise at least one of:
(i) a unique identifier assigned to a software application being used for the streaming media session (hereinafter referred to as the "AppID" for the sake of convenience only),
(ii) an identifier of a conference to which the streaming media session belongs (hereinafter referred to as the "conferenceID" for the sake of convenience only),
(iii) an identifier of the streaming media session (hereinafter referred to as the "sessionID" for the sake of convenience only),
(iv) a unique identifier of a user involved in the streaming media session (hereinafter referred to as the "userID" for the sake of convenience only),
(v) an identifier of an endpoint, for example such as a device or a browser, being used for the streaming media session (hereinafter referred to as the "endpointID" for the sake of convenience only),
(vi) an identifier of a connection pair, namely a pair of communicating entities connected, for example via a fabric (hereinafter referred to as the "pairID" for the sake of convenience only),
(vii) a unique identifier of a source of the at least one media stream (hereinafter referred to as the "sourceID" for the sake of convenience only).

In some implementations, all participants in the conference, namely all of the at least two communicating entities, are assigned the same conferenceID; in such a case, the conferenceID is unique. In other implementations, the conferenceID is not unique, and therefore, sessionIDs are used; in such a case, each participant in the conference has a different sessionID. Beneficially, for a given participant, the sessionID changes when the given participant leaves and re-joins the conference.

It will be appreciated that the endpointID is specific to a device or a browser being used for the streaming media session. As an example, if a given user has multiple devices and/or browsers, these devices and/or browsers will have different endpointIDs for the same userID.

Optionally, the sourceID is a Synchronization Source identifier (SSRC identifier, from RFC3550) that uniquely identifies the source of the at least one media stream. In the Real-time Transport Protocol (RTP), SSRCs within a same streaming media session are unique.

Optionally, SSRCs are exchanged between the at least two communicating entities during the setup of the streaming media session. As an example, during the setup of the streaming media session, the Session Description Protocol (SDP) can be used by endpoints associated with the at least two communicating entities to describe the streaming media session for purposes of session announcement, session invitation and negotiating parameters such as a media type, a media format and so forth.

More optionally, the set of parameters associated with the streaming media session comprises the AppID, the SSRC and the conferenceID. Alternatively, optionally, the set of parameters associated with the streaming media session comprises the AppID, the SSRC and the userID.

Optionally, the set of parameters associated with the streaming media session are received from at least one transmitting entity and at least one receiving entity from amongst the at least two communicating entities.

In some implementations, the at least two communicating entities comprise a plurality of transmitting entities and a plurality of receiving entities. As an example, in a video conferencing session, the at least two communicating entities could comprise a group of user entities that may act as both transmitting entities as well as receiving entities.

In other implementations, the at least two communicating entities comprise a single transmitting entity and a plurality of receiving entities. As an example, in a webcast session, the at least two communicating entities could comprise a single media server, namely an automated entity, and thousands of simultaneous listeners/viewers, namely user entities.

Moreover, according to an embodiment of the present disclosure, the plurality of observations comprise at least one of:
(i) at least one packet arrival characteristic observed for the at least one media stream and/or the at least two packets,
(ii) at least one media rendering characteristic observed for the at least one of the at least two communicating entities during rendering of the at least one media stream,
(iii) at least one transport address characteristic observed for the at least one of the at least two communicating entities,
(iv) at least one device property observed for the at least one of the at least two communicating entities,
(v) at least one environmental property observed for the at least one of the at least two communicating entities.

Optionally, the at least one packet arrival characteristic observed for the at least one media stream and/or the at least two packets comprises at least one of:
(i) the number of packets that are lost or discarded during communication,
(ii) distribution of individual and/or burst losses or discards of packets as a function of time or as a function of another monotonically-increasing marker,
(iii) a length of burst losses or discards,
(iv) packets arrived at a given communicating entity and their associated timestamps or markers,
(v) duplicate packets arrived at a given communicating entity and their associated timestamps or markers,
(vi) reordered packets.

It will be appreciated that observing the at least one packet arrival characteristic for non-media packets enables determining the session quality in an extreme case, wherein non-connectivity between the at least two communicating entities yields very poor quality of experience.

Optionally, the at least one media rendering characteristic observed for the at least one of the at least two communicating entities during the rendering of the at least one media stream comprises at least one of:
(i) stalls in rendering,
(ii) buffer overruns or underruns,
(iii) a time-bound quality metric (for example, such as a playout delay and variation thereof),
(iv) a percentage of frames generated or rendered in time,
(v) an Audio/Video (A/V) sync,
(vi) a media quality metric (for example, such as Peak-Signal-to-Noise-Ratio (PSNR) and Structural Similarity (SSIM) for video; the E model for audio; Mean-Opinion Score (MOS) and a selected media encoding and its parameters for any type of media),
(vii) a variation or skewness in other quality metrics (for example, such as a frame rate, a frame size, a packetization interval, and so forth).

Optionally, the at least one transport address characteristic observed for the at least one of the at least two communicating entities comprises at least one of:
(i) network interfaces available,
(ii) a given network interface in use,
(iii) a change in the given network interface,
(iv) handovers between different network interfaces,
(v) failed handovers,
(vi) disruptions in network connectivity,
(vii) connectivity losses,
(viii) Interactive Connectivity Establishment (ICE) candidates.

It is to be noted here that communicating entities may have multiple addresses, for example, including direct, indirect and translated addresses. Optionally, before commencing the streaming media session, the at least two communicating entities exchange probing packets to determine addresses on which they can reach each other. For illustration purposes only, there will now be considered an example wherein a communicating entity 'A' has three addresses 'A1', 'A2', 'A3' and a communicating entity 'B' has two addresses 'B1' and 'B2'. A and B exchange probing packets to determine addresses on which they can reach each other. For this purpose, A sends probing packets from its addresses A1, A2, A3 to the addresses B1 and B2 of B; B sends a response for each probing packet that it receives. When a given response is received at A, A knows that it can use the address from which it received the given response for subsequent communication. Likewise, B sends probing packets from its addresses B1 and B2 to the addresses A1, A2 and A3 of A, and determines which addresses to use for subsequent communication based on one or more responses it receives.

Optionally, the at least one device property observed for the at least one of the at least two communicating entities comprises at least one of:
(i) energy consumption of a device associated with the at least one of the at least two communicating entities,
(ii) a geographical location (namely, Geo location) of the device,
(iii) a device type of the device,
(iv) an Operating System (OS) running on the device,
(v) a version of a software application being used for the streaming media session,
(vi) battery power,
(vii) usage of computational resources (for example, such as Central Processing Unit (CPU) usage, memory usage, and so forth),
(viii) computational load (for example, such as CPU load, memory load, and so forth),
(ix) communication load,
(x) other software applications active at a time,
(xi) communication network properties (for example, such as fixed vs. mobile, wired vs. wireless, cellular vs. Wireless Local Area Network (WLAN), and so forth),
(xii) a network type of a wireless network being used (for example, such as a 3G telecommunications network, a 4G telecommunications network, and so forth),
(xiii) a signal to noise ratio (SNR) of the wireless network,
(xiv) a signal strength of the wireless network.

Optionally, the at least one environmental property observed for the at least one of the at least two communicating entities comprises at least one of:
(i) a civic location of a user using a device associated with the at least one of the at least two communicating entities (for example, such as inside or outside a building, in a vehicle, and so forth),
(ii) a location of a user with reference to a local or global positioning system (for example, the Global Positioning System (GPS)),
(iii) a velocity of the user,
(iv) a type of movement of the user (for example, such as walking, driving, on a train, in a bus, on a bicycle, and so forth),
(v) a context of an environment in which the user is present (for example, such as a density of people around, an ambient temperature, weather conditions, and so forth).

Furthermore, according to an embodiment of the present disclosure, the processing at (c) comprises at least one of: grouping the plurality of observations, filtering the plurality of observations, sampling at least a subset of the plurality of observations, rearranging the plurality of observations in a one-dimensional or multi-dimensional series, correlating the plurality of observations. Examples of the one-dimensional or multi-dimensional series include, but are not limited to, a timeline and a marker-line.

Optionally, in this regard, the processing is performed based upon at least one of:
(i) timestamps associated with the plurality of observations,
(ii) measured packet propagation delays occurring between the at least one network entity and the at least one of the at least two communicating entities and/or between at least one transmitting entity and at least one receiving entity from amongst the at least two communicating entities,
(iii) markers associated with the at least two packets, the markers being assigned to the at least two packets in a monotonically-increasing manner,
(iv) correlation of similar observations occurring within respective timelines of the at least two monitoring entities,
(v) correlation of similar observations occurring within respective marker-lines of the at least two monitoring entities, the markers being arranged in an ascending order in the marker-lines.

Additionally, optionally, the processing at (c) further comprises at least one of:
(i) performing mathematical operations on individual observations, groups of observations, or series of observations from amongst the plurality of observations,
(ii) performing statistical operations on groups or series of observations,
(iii) inferring complex observations from simple observations (for example, such as transmission rate, loss rate, goodput, throughput, Quality-of-Service (QoS), user-perceived Quality-of-Experience (QoE) and so forth),
(iv) compressing the data of the plurality of observations,
(v) transforming the representation of the data.

Optionally, the statistical operations include at least one of:
(i) computing mean, median or k-percentile values (for example, such as 99 percentile),
(ii) computing standard deviation values,
(iii) performing a trend analysis,
(iv) determining outliers (for example, with respect to individual values or a fraction),
(v) clustering,
(vi) determining and comparing distributions of such values,
(vii) transforming representations of such values (for example, from a timeline or a marker-line to the frequency domain by using, for example, the Fourier transform).

Beneficially, the data of the plurality of observations is compressed and/or transformed when the processing is performed at least in part at the at least two monitoring entities and/or the at least one reporting entity, and the data is required to be transmitted to the server arrangement. This enables faster data transmission and efficient data storage.

Optionally, the data of the plurality of observations is transmitted to the server arrangement by way of at least one data packet. More optionally, data of multiple observations is encapsulated in a single data packet. As an example, data of five observations can be encapsulated in a single data packet. As another example, data of five observations can initially be encapsulated in five different data packets, which can then be aggregated into a single data packet.

Moreover, optionally, the processing at (c) is performed in multiple stages on different sets of observations in series and/or in parallel. As an example, the processing may be performed on an original set of observations recorded at a single monitoring entity, an aggregate of multiple sets of observations recorded at different monitoring entities, a subset of observations, and so on. Optionally, the processing is performed individually for each observation and/or jointly across observations of a given type.

It will be appreciated that the processing can be performed at one place or can be distributed across several places. Optionally, the processing at (c) is performed in multiple stages at different entities. Optionally, in this regard, the processing is performed at least in part at the at least two monitoring entities and/or the at least one reporting entity. Optionally, such processing is performed for local consumption, namely at the at least two monitoring entities and/or the at least one reporting entity, and/or for reporting to another entity that is at a higher hierarchy level.

Optionally, in order for a given entity to be able to perform the processing, processing instructions are coded into the given entity by way of a software application. Optionally, the software application is updated via software updates from time to time.

Optionally, the processing instructions are provided to the given entity by another entity, for example, such as the at least one server of the server arrangement that acts as the analytics and control entity.

Optionally, the processing instructions are updated based upon at least one of: observations recorded at the given entity, an outcome of the processing performed at the given entity. Optionally, in this regard, the processing instructions are updated by using machine learning techniques.

Optionally, the processing instructions depend on configuration parameters that are adjusted according to changing requirements of the streaming media session. Optionally, the configuration parameters are adjusted based upon the observations recorded at the given entity and/or the outcome of the processing.

Moreover, according to an embodiment of the present disclosure, the at least two monitoring entities are configured at (a) to record the plurality of observations as a function of time.

Optionally, the configuring at (a) comprises synchronizing clocks of the at least two monitoring entities. Optionally, in this regard, a given monitoring entity from amongst the at least two monitoring entities is configured to maintain an offset parameter that is used to correct the time of a device clock associated with the given monitoring entity. Optionally, the given monitoring entity is configured to refresh the correct time from a predefined reference clock, and to adjust the offset parameter based upon the correct time and the time of the device clock. Accordingly, the given monitoring entity is configured to adjust timestamps associated with observations recorded at the given monitoring entity with the offset parameter.

Optionally, the given monitoring entity is configured to refresh the correct time periodically. Additionally or alternatively, optionally, the given monitoring entity is sent instructions to refresh the correct time.

It will be appreciated that the at least two monitoring entities may not necessarily have synchronized clocks; without time synchronization, the observations collected at different monitoring entities may not be coherently time-stamped.

It will also be appreciated that even after the clocks of the at least two monitoring entities are synchronized, observations related to a same event, but recorded at different monitoring entities, will have different time-stamps. When a packet traverses through a variety of network elements, there is often a packet propagation delay (for example, such as a transmission delay and/or a processing delay) associated therewith. As a result, recording of an observation of the same packet at a first monitoring entity and a second monitoring entity might occur with a time delay (for example, seconds of delay). Therefore, the plurality of observations from all of the at least two monitoring entities are aggregated for analysis at one place, namely at the at least one server of the server arrangement that acts as the analytics and control entity.

Optionally, during the processing at (c), the plurality of observations are correlated based upon packet propagation delays occurring between the entities. Optionally, in this regard, the correlating comprises:

measuring a One-Way Delay (OWD) between the at least one network entity and the at least one of the at least two communicating entities and/or between the at least one transmitting entity and the at least one receiving entity;

adjusting timestamps of observations recorded at the at least one network entity and/or the at least one of the at least two communicating entities according to the measured OWD; and mapping the plurality of observations onto a common timeline.

Optionally, the plurality of observations are correlated based upon the markers associated with the at least two packets. Optionally, in this regard, the correlating comprises mapping the plurality of observations onto a marker-line associated with a transmitting entity from which the at least two packets originated. As an example, in the RTP, packets are assigned packet sequence numbers in a strictly monotonically-increasing manner. Optionally, in such a case, observations pertaining to a given packet comprise a packet sequence number that is assigned to the given packet, and therefore, are correlated by mapping onto a marker-line associated with a transmitting entity from which the given packet originated, namely by mapping onto a series of packet sequence numbers assigned by the transmitting entity.

Additionally or alternatively, optionally, the correlating comprises mapping the plurality of observations onto a common marker-line. Optionally, for this purpose, the at least two communicating entities send, to each other, status reports (for example, such as RTP Control Protocol (RTCP) reports, when using the RTP) that include their respective highest packet sequence numbers that have been sent as well as their respective highest packet sequence numbers that have been received. Optionally, in such a case, at least one of the at least two monitoring entities is configured to perform a correlation between the packet sequence numbers that have been used in both directions within bounds of a round trip delay between the at least two communicating entities, and to establish a common marker-line for the at least two communicating entities.

Optionally, the plurality of observations are correlated by deriving information related to the at least one media stream. Optionally, in such a case, derived information, for example such as packets bursts or loss bursts, can be used to correlate observations pertaining to a same event.

It will be appreciated that the observations pertaining to the same event can be substantially similar or different for the at least one media stream. As an example, a first monitoring entity could record an observation that there was no packet loss in a given media stream, while a second monitoring entity and a third monitoring entity could record observations that there is a 5% packet loss and an 8% packet loss, respectively, in the given media stream.

Optionally, the correlation is performed by any of: the aforesaid mapping onto the common timeline, the aforesaid mapping onto the marker-line, the aforesaid information deriving, or a combination thereof. Optionally, in this regard, if an observation (for example, a packet loss burst of 'k' packets) is recorded at one monitoring entity, it is checked whether or not a similar observation (for example, a packet loss burst of 'k+/−2' packets) is recorded at another monitoring entity. If it is found that a similar observation is recorded, and if other correlation mechanisms (for example, the aforesaid mapping onto the common timeline) suggest at least an approximate correlation between these observations (for example, the observations were recorded within time 't' across the common timeline), the observations are linked to each other and inferences are drawn from the correlation. As an example, in case of packet losses, such correlation may suggest that the packet losses observed at two receiving entities occurred rather closer to a transmitting entity; this, in turn, might suggest a temporary capacity bottleneck, thereby allowing a corrective action, for example such as re-routing, to be taken whilst the streaming media session is still on-going.

It will be appreciated that even such approximate correlation is beneficial for narrowing down a search space for the correlation based upon the aforesaid information deriving. Such approximate correlation is also beneficial to limit an amount of historical data that is required to be stored and/or processed for correlation. This reduces the memory usage of the at least one server performing the analysis at (d).

The aforementioned method enables to correlate observations received from distributed, non-synchronized entities, thereby enabling corrective actions to be taken whilst the streaming media session is still on-going. Narrowing down the search space for processing the observations allows near real-time operation.

As an example of the complexity of the problem being solved pursuant to embodiments of the present disclosure, picture a webcast of large multinational company that involves thousands of simultaneous listeners, possibly ten thousand network elements in the data communication network, geographically spanning continents and a multitude of Communications Service Providers (CSPs), ISPs, operators and the like. The aforementioned method enables analysis of the session quality to be performed during the webcast, and accordingly, proposes a correction action for any of the listeners suffering from bad reception.

For illustration purposes only, there will now be considered an example of how the plurality of observations can be correlated. One such example has been illustrated in conjunction with FIG. 3 as explained in more detail below.

In the illustrated example, there will now be considered that communicating entities 'A' and 'B' are communicating packets in a video call session 'S'. A sends, to B, a media stream 'DSA' comprising audio and video, while B sends, to A, a media stream 'DSB' comprising audio and video. The media streams 'DSA' and 'DSB' traverse a data communication network, for example via a network entity 'N'.

In the illustrated example, there will next be considered that A, B and N are configured to act as monitoring entities, and have clocks that are substantially in sync with each other. A, B and N send observations recorded thereat to an analytics and control entity 'C'. Optionally, A, B and N process the observations at least partly, before sending the observations to C.

Now, if A makes an observation of an event related to DSA and B makes an observation related to the same event, these related observations received in C will have different timestamps. Thus, in order to correlate the observations received from A, B and N, C optionally defines a common timeline 'T' related to the video call session 'S' and maps the observations received from A, B and N onto the common timeline "T". Optionally, the correlation is performed by utilizing information resident in packets communicated in the media streams 'DSA' and 'DSB', or by deriving information related to the media streams 'DSA' and 'DSB'.

Optionally, the correlation is performed by using packet propagation delays occurring between any two of: A, B, N. Optionally, in such a case, an OWD between, for example, A and N is measured, and timestamps of observations recorded at A and/or N (namely, either or both of A and N) are adjusted according to the OWD.

Additionally or alternatively, optionally, the correlation is performed by using markers (for example, such as packet sequence numbers in the RTP) included in the packets. Optionally, in such a case, observations pertaining to the packets communicated in the media stream 'DSA' are mapped onto a marker-line associated with A, while observations pertaining to the packets communicated in the media stream 'DSB' are mapped onto a marker-line associated with B. Additionally or alternatively, optionally, the observations pertaining to the packets communicated in the media streams 'DSA' and 'DSB' are mapped onto a common marker-line.

Additionally, optionally, the correlation is performed by using the derived information related to the media streams. Optionally, in such a case, derived information, for example such as loss bursts, can be used to correlate observations pertaining to a same event.

Optionally, when the plurality of observations are recorded as a function of time, the analyzing at (d) comprises:
(i) selecting a time window with respect to the common timeline;
(ii) processing a given set of pre-processed observations that fall inside the time window; and
(iii) determining correlated events pertaining to the given set of pre-processed observations.

Optionally, in this regard, the time window is selected based upon at least one of:
(i) a round-trip delay between the at least two communicating entities,
(ii) a round-trip delay between at least one of the at least two monitoring entities and at least one reporting entity,
(iii) a pre-defined value,
(iv) a type of data communication network between the at least two communicating entities.

Optionally, with respect to (iv), the time window can be tailored for a particular user or for users on the data communication network. As an example, different time windows can be used depending upon whether a mobile network or a fixed-line network is used.

It will be appreciated that the time window may be defined as 10 milliseconds, 100 milliseconds, 1 second, 5 seconds, 10 seconds and so on.

Optionally, the size of the time window is fixed. Alternatively, optionally, the size of the time window is variable. Optionally, in such a case, the size of the time window is adjusted dynamically, based upon notable changes in observations. As an example, if a notable change in communication properties is observed, the size of the time window can be reduced to perform the processing more frequently and/or at a finer granularity. As another example, if it is observed that the network bandwidth is scarce, the size of the time window can be increased to perform the processing less frequently so as to not affect media streams being communicated during the streaming media session.

Optionally, the time window is a sliding window. More optionally, the time window is partly overlapping. Alternatively, optionally, the time window is non-overlapping. In case of a non-overlapping time window, there may or may not be gaps in-between adjacent windows.

For illustration purposes only, there will now be considered an example of how a time window can be used to correlate events. In the example, there will now be considered that it is known that a maximum one-way delay between a first monitoring entity and a second monitoring entity is 2 seconds, and therefore, a maximum time drift is +/−2 seconds. Now, if an observation is recorded at time 't0'

(in seconds) on a timeline 'T1' of the first monitoring entity, then a time window falling into a time interval [t0−2; t0+2] on a timeline 'T2' of the second monitoring entity would be searched for similar or other related observations.

It will be appreciated that time windows can also be used during the processing of the plurality of observations at the different entities. Optionally, in this regard, a given entity is operable to employ multiple independent time windows for different purposes. More optionally, the given entity is operable to employ at least one of:
(i) at least one time window for each type of observations,
(ii) at least one time window for each monitoring entity or each reporting entity,
(iii) at least one time window for each type of processing performed.

Moreover, according to an embodiment of the present disclosure, the at least two monitoring entities are configured at (a) to record the plurality of observations as a function of a monotonically-increasing marker associated with the at least two data packets. Optionally, in such a case, the analyzing at (d) comprises:
(i) selecting a window with respect to the marker-line associated with a transmitting entity from which the at least two data packets originated and/or the common marker-line;
(ii) processing a given set of pre-processed observations that fall inside the window; and
(iii) determining correlated events pertaining to the given set of pre-processed observations.

The size of the window can be fixed or variable. It will be appreciated that the window may be defined as 20 consecutive packet sequence numbers, 100 consecutive packet sequence numbers, 200 consecutive packet sequence numbers, 500 consecutive packet sequence numbers, 1000 consecutive packet sequence numbers, and so on. Likewise, when media-related time stamps are employed, the window may be defined as 20 consecutive time stamps, 100 consecutive time stamps, 200 consecutive time stamps, 500 consecutive time stamps, 1000 consecutive time stamps, and so on.

Optionally, the window is a sliding window. More optionally, the window is partly overlapping. Alternatively, optionally, the window is non-overlapping. In case of a non-overlapping window, there may or may not be gaps in-between adjacent windows.

Furthermore, according to an embodiment of the present disclosure, the at least one notification comprises at least one of: statistical data pertaining to the session quality, instructions to perform a corrective action.

As an example, the statistical data pertaining to the session quality is provided in a format that is suitable for showing on a dashboard. As another example, the instructions can be sent to a transmitting entity, for example such as a media encoder, to perform a corrective action, for example such as changing a bit rate or a resolution of media content being communicated during the streaming media session. As yet another example, the instructions can be sent to a network entity to perform a corrective action, for example such as re-routing packets. As still another example, the instructions can be sent to the at least two monitoring entities and/or the at least one reporting entity to perform a corrective action, for example, such as sending the observations to another server of the server arrangement.

Optionally, the at least one quality criterion is satisfied, when the session quality falls below a threshold value. Optionally, the method comprises self-tuning the threshold value.

Optionally, in this regard, the threshold value is tuned according to quality-based metrics that are computed based upon user's feedback, for example, such as a user perceived QoE. The user's feedback can be collected at any point of time, namely during and/or after the streaming media session. Moreover, the user's feedback can be collected multiple times during the streaming media session.

Additionally, optionally, the threshold value is tuned according to quality-based metrics that are computed by correlating user actions with the data of the plurality of observations. As an example, a bad quality of a video being rendered can be correlated with toggling off of the video by the user.

Optionally, the threshold value is updated globally. More optionally, the threshold value is updated at each server of the server arrangement.

It will be appreciated that in order to correlate observations recorded at different monitoring entities, it is important that all observations are received at a same server. Moreover, in order to be able to perform the correlation as close to real-time as possible, the method optionally comprises selecting at least one server that is geographically located as proximally as possible to a majority of the at least two communicating entities. Optionally, in this regard, the method further comprises selecting, from amongst a plurality of available servers, at least one server that is in a proximity of the at least two communicating entities, wherein (a) to (e) are performed at the at least one server.

Optionally, the selecting is performed when the streaming media session is setup. Additionally, optionally, the selecting is performed again when a new communicating entity joins or when an existing communicating entity leaves the streaming media session.

For illustration purposes only, there will now be considered an example in which a user 'Jon', who is geographically located in the US, makes a video conference call to another user 'Mary', who is geographically located in Australia, using an online video conferencing service, for example such as the BlueJeans® video conferencing service that uses the Twilio® cloud-based communications infrastructure. In the illustrated example, there will now be considered that Jon's and Mary's conference endpoints, namely devices or browsers being used by Jon and Mary, are configured to act as monitoring entities. Moreover, network devices from the Twilio® communications infrastructure that are dedicated to the BlueJeans® video conferencing service are also configured to act as monitoring entities.

The monitoring entities send observations recorded for the video conference call to the server arrangement. Optionally, in order to be able to perform the correlation as close to real-time as possible, the server arrangement is operable to select at least one server that is in a proximity of Jon's and Mary's conference endpoints. As a result, the observations may be sent to a server that is geographically located, for example, at Hong Kong. If a new user joins, for example, from Singapore, all the observations may still be sent to the server located at Hong Kong. However, if a new user joins, for example, from Europe, the observations might instead be sent to another server that is geographically located, for example, at the US.

The aforementioned method can be beneficially implemented by ISPs and CSPs, for example, for purposes of measuring the performance of their media relay servers, media gateways, conference bridges and the like in real-time or near real-time. As an example, a CSP may use the aforementioned method to analyze the performance of calls, wherein at least one of following subsets of calls may be selected for joint inspection:

individual calls, calls of individual users or groups of users belonging to a same communication service (offered by one CSP) or different communication services (offered by different CSPs), calls between entities belonging to a certain offering of a corporation that provides multimedia communication services for end users (the corporation being referred to as a User Service Provider (USP), wherein the USP is considered logically different from a CSP), calls between entities using a same ISP or different ISPs, groups of calls belonging to a communication service offered by one CSP, groups of calls belonging to different communication services offered by different CSPs.

For illustration purposes only, there will now be considered an example in which communicating entities 'A' and 'B' are on different ISPs 'A1' and 'B1', respectively, wherein A calls B using a call service provided by a corporation 'XYZ' (namely, a USP) that is utilizes a CSP. Observations recorded at monitoring entities comprising at least two of: A, B, at least one network entity on ISP 'A1', at least one network entity on ISP 'B1' are aggregated to selectively analyze the performance of the call. In such a case, observations pertaining to at least one of following may be aggregated:

all calls made by A or received by A, all calls between A and B, all calls involving ISP 'A1' or all calls involving both ISPs 'A1' and 'B1', all calls of a certain USP or all calls of a certain USP operated by a certain CSP, all calls done via a certain CSP, all calls traversing a certain set of Autonomous Systems (ASes), all calls originating or terminating or traversing a certain geographic region (for example, a country) or a certain topological region (for example, an AS).

In a second aspect, embodiments of the present disclosure provide a system for analyzing a streaming media session between at least two communicating entities, wherein at least one media stream comprising at least two packets is communicated between the at least two communicating entities during the streaming media session, the system comprising a server arrangement that is operable to:

(a) configure at least two monitoring entities to record a plurality of observations pertaining to at least one of: the at least one media stream, the at least two packets, devices associated with at least one of the at least two communicating entities, wherein the at least two monitoring entities comprise at least one of: at least one network entity forwarding the at least one media stream between the at least two communicating entities, the at least one of the at least two communicating entities;

(b) receive, from the at least two monitoring entities, the plurality of observations;

(c) process the plurality of observations to obtain a plurality of pre-processed observations;

(d) analyze the plurality of pre-processed observations to determine a session quality; and (e) send at least one notification to at least one of the at least two monitoring entities, if the session quality satisfies at least one quality criterion, wherein the at least one notification is sent during the streaming media session.

The server arrangement comprises at least one server and at least one database associated with the at least one server. Optionally, the server arrangement comprises a plurality of servers and a plurality of databases associated therewith.

In one implementation, the at least one server and the at least one database are implemented by way of cloud computing services.

The server arrangement is coupled in communication with the at least two monitoring entities via a data communication network. The data communication network can be a collection of individual networks, interconnected with each other and functioning as a single large network. Such individual networks may be wired, wireless, or a combination thereof. Examples of such individual networks include, but are not limited to, LANs, WANs, MANs, WLANs, WWANs, WMANs, the Internet, 2G telecommunication networks, 3G telecommunication networks, 4G telecommunication networks, 5G telecommunication networks, community networks, satellite networks, vehicular networks, sensor networks, and WiMAX networks.

Moreover, the at least two communicating entities are communicably coupled with each other via the data communication network.

The at least two communicating entities comprise at least one user entity. Examples of the devices associated with the at least one of the at least two communicating entities include, but are not limited to, mobile phones, smart telephones, MIDs, tablet computers, UMPCs, phablet computers, PDAs, web pads, PCs, handheld PCs, laptop computers, desktop computers, and large-sized touch screens with embedded PCs. Some specific examples of such devices include, but are not limited to, iPhone®, iPad®, Android® phone, Android® web pad, Windows® phone, and Windows® web pad.

Optionally, the at least two communicating entities comprise at least one automated entity.

Optionally, the server arrangement is operable to receive the plurality of observations from the at least two monitoring entities, via at least one reporting entity. Optionally, in this regard, the plurality of observations are received via reports from different entities, as described earlier.

Optionally, the different entities are configured to send the reports on a regular basis. Alternatively, optionally, the different entities are configured to send the reports on an event-driven basis. Yet alternatively, optionally, the different entities are configured to send the reports at varying intervals. More optionally, the varying intervals are dynamically adjusted.

Optionally, the plurality of observations comprise observations that require urgent analysis, and therefore, are sent for analysis in real time.

Moreover, optionally, the server arrangement is operable to select the at least one reporting entity to be used for collecting data of the plurality of observations. Optionally, in this regard, the at least one reporting entity is selected based upon computational load of the at least one reporting entity and/or a proximity of the at least one reporting entity to the at least two monitoring entities.

It will be appreciated that a frequency at which a given monitoring entity monitors and records observations can be constant or can change over time. Optionally, the frequency is configured by another entity, for example, such as at least one server of the server arrangement that acts as an analytics and control entity. Alternatively, optionally, the frequency is varied automatically within upper and lower bounds defined by the at least one server, as described earlier.

Moreover, optionally, the server arrangement is operable to:

(f) receive, from the at least one of the at least two communicating entities, a set of parameters associated with the streaming media session, wherein the set of parameters uniquely identifies the streaming media session; and (g) use the set of parameters to identify the at least two packets being communicated during the streaming media session.

Optionally, in this regard, the at least one of the at least two communicating entities is configured to send the set of parameters to the server arrangement when the streaming media session is setup.

Optionally, the set of parameters associated with the streaming media session comprise at least one of:
(i) an AppID,
(ii) a conferenceID,
(iii) a sessionID,
(iv) a userID,
(v) an endpointID,
(vi) a pairID,
(vii) a sourceID.

More optionally, the set of parameters associated with the streaming media session comprises the AppID, the SSRC and the conferenceID. Alternatively, optionally, the set of parameters associated with the streaming media session comprises the AppID, the SSRC and the userID.

Optionally, the set of parameters associated with the streaming media session are received from at least one transmitting entity and at least one receiving entity from amongst the at least two communicating entities.

In some implementations, the at least two communicating entities comprise a plurality of transmitting entities and a plurality of receiving entities. As an example, in a video conferencing session, the at least two communicating entities could comprise a group of user entities that may act as both transmitting entities as well as receiving entities.

In other implementations, the at least two communicating entities comprise a single transmitting entity and a plurality of receiving entities. As an example, in a webcast session, the at least two communicating entities could comprise a single media server, namely an automated entity, and thousands of simultaneous listeners/viewers, namely user entities.

Moreover, according to an embodiment of the present disclosure, the plurality of observations comprise at least one of:
(i) at least one packet arrival characteristic observed for the at least one media stream and/or the at least two packets,
(ii) at least one media rendering characteristic observed for the at least one of the at least two communicating entities during rendering of the at least one media stream,
(iii) at least one transport address characteristic observed for the at least one of the at least two communicating entities,
(iv) at least one device property observed for the at least one of the at least two communicating entities,
(v) at least one environmental property observed for the at least one of the at least two communicating entities.

Furthermore, according to an embodiment of the present disclosure, the server arrangement is operable to process the plurality of observations by at least one of: grouping the plurality of observations, filtering the plurality of observations, sampling at least a subset of the plurality of observations, rearranging the plurality of observations in a one-dimensional or multi-dimensional series, correlating the plurality of observations.

Optionally, in this regard, the server arrangement is operable to process the plurality of observations based upon at least one of:
(i) timestamps associated with the plurality of observations,
(ii) measured packet propagation delays occurring between the at least one network entity and the at least one of the at least two communicating entities and/or between at least one transmitting entity and at least one receiving entity from amongst the at least two communicating entities,
(iii) markers associated with the at least two packets, the markers being assigned to the at least two packets in a monotonically-increasing manner,
(iv) correlation of similar observations occurring within respective timelines of the at least two monitoring entities,
(v) correlation of similar observations occurring within respective marker-lines of the at least two monitoring entities, the markers being arranged in an ascending order in the marker-lines.

Additionally, optionally, the server arrangement is further operable to process the plurality of observations by at least one of:
(i) performing mathematical operations on individual observations, groups of observations, or series of observations from amongst the plurality of observations,
(ii) performing statistical operations on groups or series of observations,
(iii) inferring complex observations from simple observations,
(iv) compressing data of the plurality of observations,
(v) transforming the representation of the data.

Moreover, optionally, the plurality of observations are processed in multiple stages on different sets of observations in series and/or in parallel, as described earlier.

It will be appreciated that the plurality of observations can be processed at one place or in a distributed manner across several places. Optionally, the plurality of observations are processed in multiple stages at different entities. Optionally, in this regard, the plurality of observations are processed at least in part at the at least two monitoring entities and/or the at least one reporting entity, as described earlier.

Moreover, according to an embodiment of the present disclosure, the server arrangement is operable to configure the at least two monitoring entities to record the plurality of observations as a function of time. Optionally, in this regard, the server arrangement is operable to synchronize clocks of the at least two monitoring entities.

Optionally, during the processing at (c), the server arrangement is operable to correlate the plurality of observations based upon packet propagation delays occurring between the entities, as described earlier. Optionally, in this regard, the server arrangement is operable to correlate the plurality of observations by:

measuring an OWD between the at least one network entity and the at least one of the at least two communicating entities and/or between the at least one transmitting entity and the at least one receiving entity;

adjusting timestamps of observations recorded at the at least one network entity and/or the at least one of the at least two communicating entities according to the measured OWD; and mapping the plurality of observations onto a common timeline.

Optionally, the server arrangement is operable to correlate the plurality of observations based upon the markers associated with the at least two packets. Optionally, in this regard, the server arrangement is operable to correlate the plurality of observations by mapping the plurality of observations onto a marker-line associated with a transmitting entity from which the at least two packets originated. Additionally or alternatively, optionally, the server arrangement is operable to correlate the plurality of observations by mapping the plurality of observations onto a common marker-line, as described earlier.

Optionally, the server arrangement is operable to correlate the plurality of observations by deriving information related to the at least one media stream.

It will be appreciated that even approximate correlations are beneficial for narrowing down a search space and for limiting an amount of historical data that is required to be stored and/or processed for correlation. This reduces the memory usage of at least one server of the server arrangement performing the analysis at (d).

Optionally, when the plurality of observations are recorded as a function of time, the server arrangement is operable to analyze the plurality of pre-processed observations by:
(i) selecting a time window with respect to the common timeline;
(ii) processing a given set of pre-processed observations that fall inside the time window; and
(iii) determining correlated events pertaining to the given set of pre-processed observations.

It will be appreciated that time windows can also be used during the processing of the plurality of observations at the different entities. Optionally, in this regard, a given entity is operable to employ multiple independent time windows for different purposes, as described earlier.

Moreover, according to an embodiment of the present disclosure, the server arrangement is operable to configure the at least two monitoring entities to record the plurality of observations as a function of a monotonically-increasing marker associated with the at least two data packets. Optionally, in such a case, the server arrangement is operable to analyze the plurality of pre-processed observations by:
(i) selecting a window with respect to the marker-line associated with a transmitting entity from which the at least two data packets originated and/or the common marker-line;
(ii) processing a given set of pre-processed observations that fall inside the window; and
(iii) determining correlated events pertaining to the given set of pre-processed observations.

Furthermore, according to an embodiment of the present disclosure, the at least one notification comprises at least one of: statistical data pertaining to the session quality, instructions to perform a corrective action. Examples of such corrective actions have been provided in conjunction with the aforementioned first aspect.

Optionally, the at least one quality criterion is satisfied, when the session quality falls below a threshold value. Optionally, the server arrangement is operable to self-tune the threshold value, as described earlier.

Furthermore, according to an embodiment of the present disclosure, the server arrangement is operable to select, from amongst a plurality of available servers of the server arrangement, at least one server that is in a proximity of the at least two communicating entities, wherein the at least one server is operable to perform (a) to (e).

Optionally, such selection is performed when the streaming media session is setup. Additionally, optionally, the selection is performed again when a new communicating entity joins or when an existing communicating entity leaves the streaming media session.

For illustration purposes only, there will now be considered an example network environment, wherein a system for analyzing a streaming media session between at least two communicating entities is implemented pursuant to embodiments of the present disclosure. One such network environment has been illustrated in conjunction with FIGS. 1A and 1B as explained in more detail below.

The network environment comprises at least two communicating entities, at least one network entity, at least one reporting entity, and a server arrangement comprising at least one server. The at least one server acts as an analytics and control entity.

A streaming media session is setup between the at least two communicating entities, wherein the at least one network entity forwards packets between the at least two communicating entities.

The at least one network entity as well as at least one of the at least two communicating entities are configured to act as monitoring entities. Each monitoring entity is operable to monitor and record observations pertaining to the streaming media session, and is optionally operable to process the observations. Moreover, each monitoring entity is operable to send the plurality of observations to its corresponding reporting entity. Each reporting entity is operable to send the observations to another reporting entity or the analytics and control entity, and is optionally operable to process the observations received thereat prior to sending.

The analytics and control entity is operable to analyze the observations to determine a session quality of the streaming media session, and to send notifications to the monitoring entities, when required.

DETAILED DESCRIPTION OF THE DRAWINGS

Figure 1B:
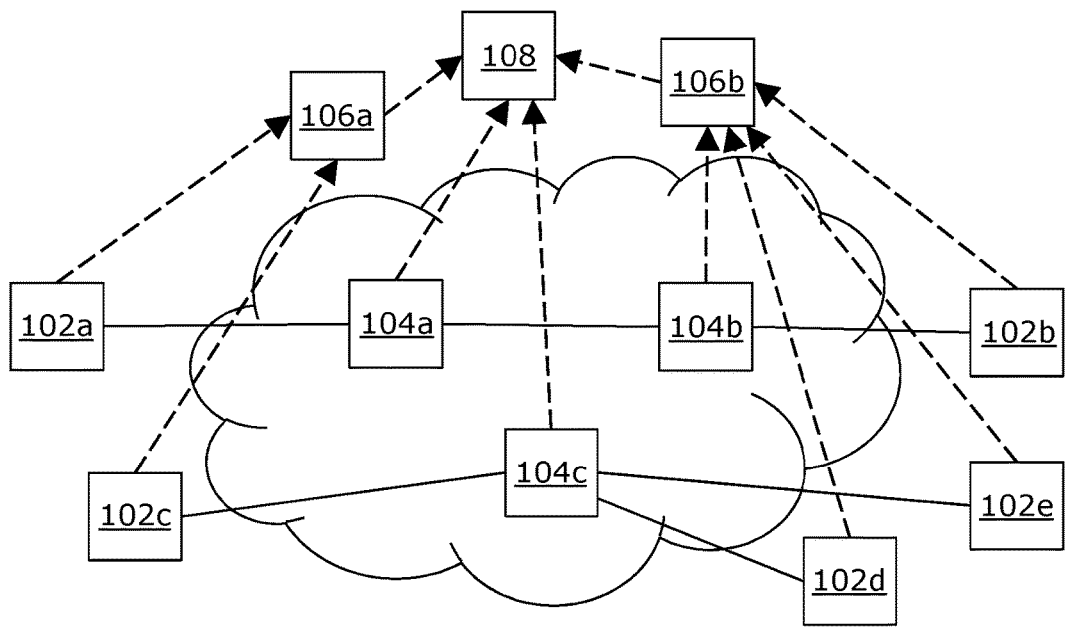

Referring now to the drawings, particularly by their reference numbers, FIGS. 1A and 1B collectively are a schematic illustration of a network environment, wherein a system for analyzing a streaming media session between at least two communicating entities is implemented pursuant to embodiments of the present disclosure.

The network environment comprises:
at least two communicating entities, depicted as communicating entities 102a, 102b, 102c, 102d and 102e (hereinafter collectively referred to as the communicating entities 102),
at least one network entity, depicted as network entities 104a, 104b and 104c (hereinafter collectively referred to as the network entities 104),
at least one reporting entity, depicted as reporting entities 106a and 106b (hereinafter collectively referred to as the reporting entities 106), and
a server arrangement 108 comprising at least one server.

With reference to FIG. 1A, the communicating entities 102a and 102b communicate via the network entities 104a and 104b, while the communicating entities 102c, 102d and 102e communicate via the network entity 104c.

It is assumed that each of the communicating entities 102 and the network entities 104 acts as a monitoring entity, and therefore, sends observations recorded thereat to the server arrangement 108 either directly or via at least one reporting entity. With reference to FIG. 1B, the communicating entities 102a and 102c send their observations to the server arrangement 108 via the reporting entity 106a; the network entities 104a and 104c send their observations to the server arrangement 108 directly; the communicating entities 102b, 102d and 102e and the network entity 104b send their observations to the server arrangement 108 via the reporting entity 106b.

FIGS. 1A and 1B are merely examples, which should not unduly limit the scope of the claims herein. It is to be understood that the specific designation for the network environment is provided as an example and is not to be construed as limiting the network environment to specific numbers, types, or arrangements of communicating entities, network entities, reporting entities, and server arrangement. FIGS. 1A and 1B aim to illustrate network environment topology, whereas the data flows between the entities may differ. A person skilled in the art will recognize many variations, alternatives, and modifications of embodiments of the present disclosure. As an example, one of the communicating entities 102c, 102d and 102e could be an automated entity, for example such as a conference server, that is responsible for setting up a conference call between the other two of the communicating entities 102c, 102d and 102e. Another example is that 104c could be a communicating entity.

Figure 2:
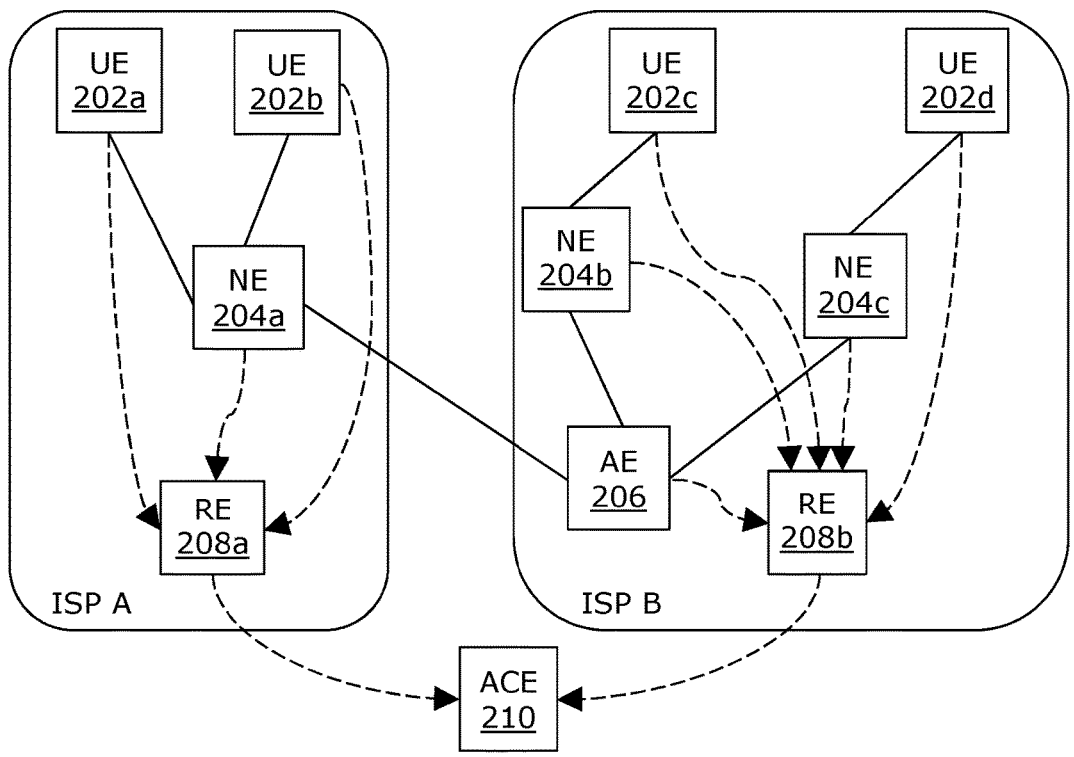
FIG. 2 is a schematic illustration of a simplified example of a hierarchy between monitoring entities, reporting entities and an analytics and control entity, in accordance with an embodiment of the present disclosure.

FIG. 2 is a schematic illustration of a simplified example of a hierarchy between monitoring entities, reporting entities and an analytics and control entity, in accordance with an embodiment of the present disclosure.

User entities 202a, 202b, 202c and 202d (hereinafter collectively referred to as the user entities 202) are communicating in a conference call. The user entities 202a and 202b are communicating via a network entity 204a on an ISP 'A', while the user entities 202c and 202d are communicating via network entities 204b and 204c, respectively, on another ISP 'B'. The network entities 204a, 204b and 204c are hereinafter collectively referred to as the network entities 204.

The conference call is being executed on an automated entity 206. In FIG. 2, communication links between entities are shown with solid lines.

In the illustrated example, it is assumed that the user entities 202, the network entities 204 and the automated entity 206 are configured to act as monitoring entities.

With reference to FIG. 2, the user entities 202a and 202b and the network entity 204a send their observations to a reporting entity 208a, while the user entities 202c and 202d, the network entities 204b and 204c and the automated entity 206 send their observations to another reporting entity 208b. Subsequently, the reporting entities 208a and 208b send data of the observations to an analytics and control entity 210, either directly or via other reporting entities.

FIG. 2 is merely an example, which should not unduly limit the scope of the claims herein. A person skilled in the art will recognize many variations, alternatives, and modifications of embodiments of the present disclosure.

Figure 3:
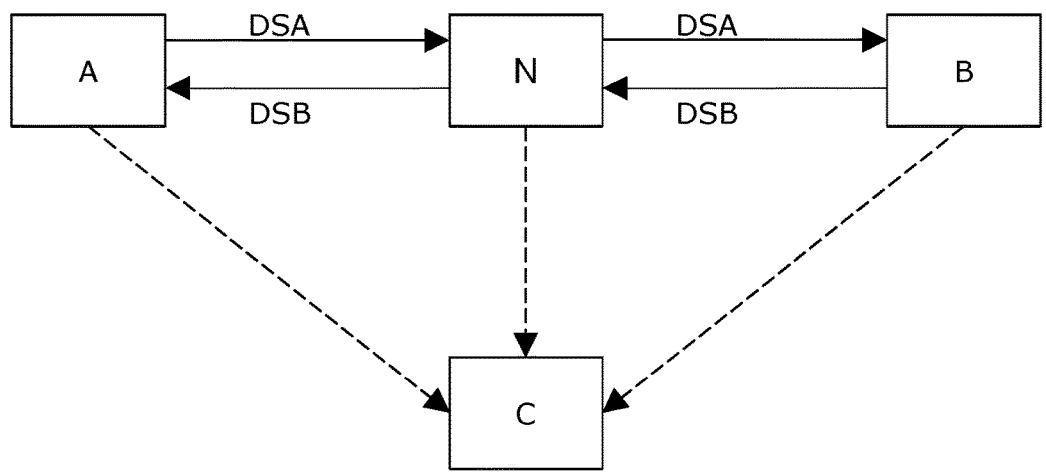
FIG. 3 is a schematic illustration of an example of how observations recorded at different monitoring entities are correlated, in accordance with an embodiment of the present disclosure.

FIG. 3 is a schematic illustration of an example of how observations recorded at different monitoring entities are correlated, in accordance with an embodiment of the present disclosure.

With reference to FIG. 3, communicating entities 'A' and 'B' are communicating packets in a video call session 'S'. A sends, to B, a media stream 'DSA' comprising audio and video, while B sends, to A, a media stream 'DSB' comprising audio and video. The media streams 'DSA' and 'DSB' traverse a data communication network via a network entity 'N'.

In the illustrated example, A, B and N are configured to act as monitoring entities, and to send observations recorded thereat to an analytics and control entity 'C'. C correlates the observations received from A, B and N, by utilizing information resident in packets communicated in the media streams 'DSA' and 'DSB', or by deriving information related to the media streams 'DSA' and 'DSB', as described earlier.

It will be appreciated that there can be multiple network entities between A and B; however, a single network entity has been shown for the sake of simplicity.

FIG. 3 is merely an example, which should not unduly limit the scope of the claims herein. A person skilled in the art will recognize many variations, alternatives, and modifications of embodiments of the present disclosure.

Figure 4:
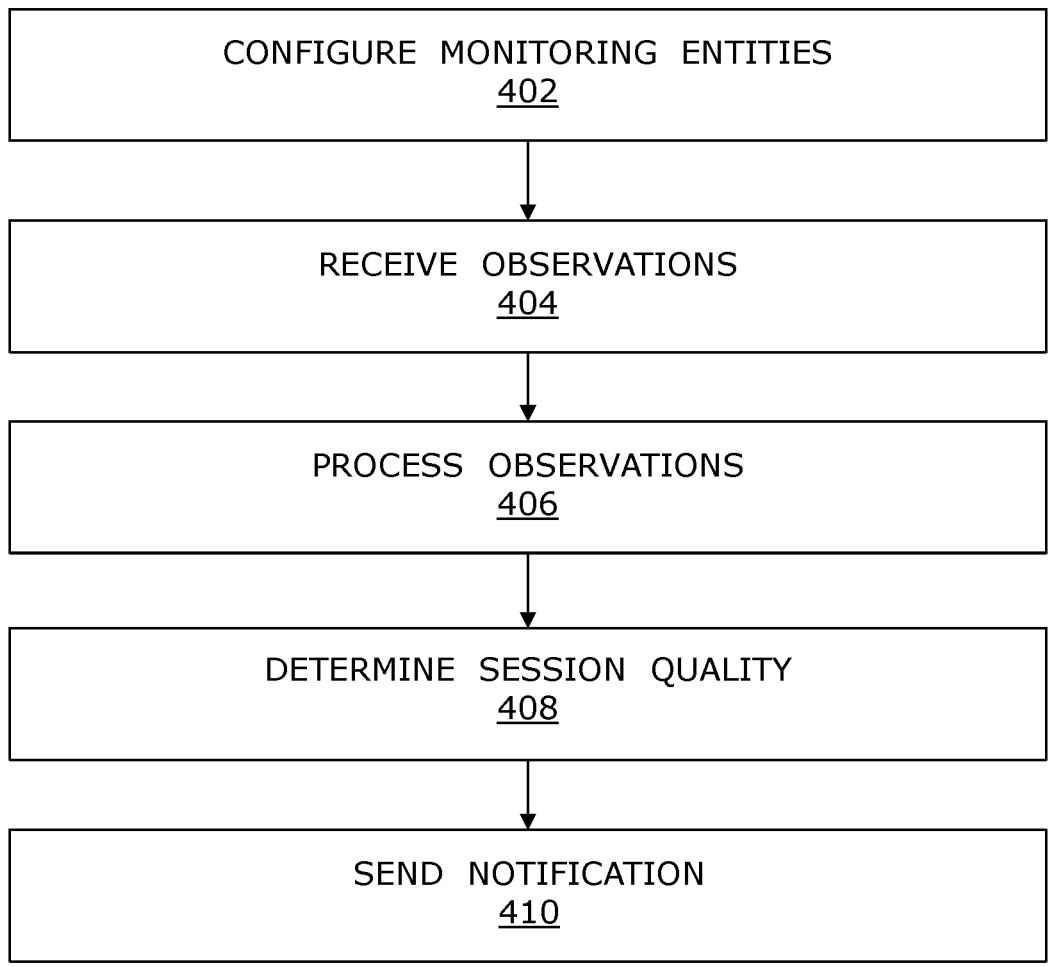
FIG. 4 is an illustration of steps of a method for analyzing a streaming media session between at least two communicating entities, in accordance with an embodiment of the present disclosure.

FIG. 4 is an illustration of steps of a method for analyzing a streaming media session between at least two communicating entities, in accordance with an embodiment of the present disclosure. The method is depicted as a collection of steps in a logical flow diagram, which represents a sequence of steps that can be implemented in hardware, software, firmware or a combination thereof.

At least one media stream comprising at least two packets is communicated between the at least two communicating entities during the streaming media session. The method is implemented by way of a server arrangement comprising at least one server that is operable to act as an analytics and control entity.

At a step 402, the server arrangement configures at least two monitoring entities to record a plurality of observations pertaining to at least one of: the at least one media stream, the at least two packets, devices associated with at least one of the at least two communicating entities. The at least two monitoring entities comprise at least one of: at least one network entity forwarding the at least one media stream between the at least two communicating entities, the at least one of the at least two communicating entities.

At a step 404, the server arrangement receives, from the at least two monitoring entities, the plurality of observations.

Subsequently, at a step 406, the server arrangement processes the plurality of observations to obtain a plurality of pre-processed observations.

Next, at a step 408, the server arrangement analyzes the plurality of pre-processed observations to determine a session quality.

At a step 410, the server arrangement sends at least one notification to at least one of the at least two monitoring entities, if the session quality satisfies at least one quality criterion. In accordance with the step 410, the at least one notification is sent during the streaming media session.

The steps 402 to 410 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for analyzing a streaming media session between at least two communicating entities, wherein at least one media stream comprising at least two packets is communicated between the at least two communicating entities during the streaming media session, the method comprising:
- (a) configuring at least two monitoring entities to record a plurality of observations pertaining to at least one of: the at least one media stream, the at least two packets, devices associated with at least one of the at least two communicating entities, wherein the at least two monitoring entities comprise at least one of: at least one network entity forwarding the at least one media stream between the at least two communicating entities, the at least one of the at least two communicating entities;
- (b) receiving, from the at least two monitoring entities, the plurality of observations;
- (c) processing the plurality of observations to obtain a plurality of pre-processed observations;
- (d) analyzing the plurality of pre-processed observations to determine a session quality; and
- (e) sending at least one notification to at least one of the at least two monitoring entities, if the session quality satisfies at least one quality criterion, wherein the at least one notification is sent during the streaming media session;

wherein the at least two monitoring entities are configured at (a) to record the plurality of observations as a function of time, and wherein the configuring comprises synchronizing clocks of the at least two monitoring entities; and wherein the analyzing at (d) comprises:
- (i) selecting a time window with respect to a common timeline;
- (ii) processing a given set of pre-processed observations that fall inside the time window; and
- (iii) determining correlated events pertaining to the given set of pre-processed observations.

2. The method according to claim 1, wherein the plurality of observations comprise at least one of:
- (i) at least one packet arrival characteristic observed for the at least one media stream and/or the at least two packets,
- (ii) at least one media rendering characteristic observed for the at least one of the at least two communicating entities during rendering of the at least one media stream,
- (iii) at least one transport address characteristic observed for the at least one of the at least two communicating entities,
- (iv) at least one device property observed for the at least one of the at least two communicating entities,
- (v) at least one environmental property observed for the at least one of the at least two communicating entities.

3. The method according to claim 1, wherein the processing at (c) comprises at least one of: grouping the plurality of observations, filtering the plurality of observations, sampling at least a subset of the plurality of observations, rearranging the plurality of observations in a one-dimensional or multi-dimensional series, correlating the plurality of observations, wherein the processing is performed based upon at least one of:
- (i) timestamps associated with the plurality of observations,
- (ii) measured packet propagation delays occurring between the at least one network entity and the at least one of the at least two communicating entities and/or between at least one transmitting entity and at least one receiving entity from amongst the at least two communicating entities,
- (iii) markers associated with the at least two packets, the markers being assigned to the at least two packets in a monotonically-increasing manner,
- (iv) correlation of similar observations occurring within respective timelines of the at least two monitoring entities,
- (v) correlation of similar observations occurring within respective marker-lines of the at least two monitoring entities, the markers being arranged in an ascending order in the marker-lines.

4. The method according to claim 1, wherein the time window is selected based upon at least one of: a round-trip delay between the at least two communicating entities, a round-trip delay between at least one of the at least two monitoring entities and at least one reporting entity, a pre-defined value, a type of data communication network between the at least two communicating entities.

5. The method according to claim 1, wherein the at least one notification comprises at least one of: statistical data pertaining to the session quality, instructions to perform a corrective action.

6. The method according to claim 1, wherein the method further comprises selecting, from amongst a plurality of available servers, at least one server that is in a proximity of the at least two communicating entities, wherein (a) to (e) are performed at the at least one server.

7. The method according to claim 1, wherein the method further comprises:
- (f) receiving, from the at least one of the at least two communicating entities, a set of parameters associated with the streaming media session, wherein the set of parameters uniquely identifies the streaming media session; and
- (g) using the set of parameters to identify the at least two packets being communicated during the streaming media session.

8. A method for analyzing a streaming media session between at least two communicating entities, wherein at least one media stream comprising at least two packets is communicated between the at least two communicating entities during the streaming media session, the method comprising:
- (a) configuring at least two monitoring entities to record a plurality of observations pertaining to at least one of: the at least one media stream, the at least two packets, devices associated with at least one of the at least two communicating entities, wherein the at least two monitoring entities comprise at least one of: at least one network entity forwarding the at least one media stream between the at least two communicating entities, the at least one of the at least two communicating entities;
- (b) receiving, from the at least two monitoring entities, the plurality of observations;
- (c) processing the plurality of observations to obtain a plurality of ore-processed observations;
- (d) analyzing the plurality of pre-processed observations to determine a session quality; and
- (e) sending at least one notification to at least one of the at least two monitoring entities, if the session quality satisfies at least one quality criterion, wherein the at least one notification is sent during the streaming media session;

wherein the at least two monitoring entities are configured at (a) to record the plurality of observations as a function of a monotonically-increasing marker associated with the at least two data packets; and wherein the analyzing at (d) comprises:

(i) selecting a window with respect to a marker-line associated with a transmitting entity from which the at least two data packets originated and/or a common marker-line;

(ii) processing a given set of pre-processed observations that fall inside the window; and (iii) determining correlated events pertaining to the given set of pre-processed observations.

9. The method according to claim 8, wherein the marker is a packet-sequence number that is uniquely assigned to each of the at least two packets in a monotonically-increasing manner.

10. A system for analyzing a streaming media session between at least two communicating entities, wherein at least one media stream comprising at least two packets is communicated between the at least two communicating entities during the streaming media session, the system comprising a server arrangement that is operable to:

(a) configure at least two monitoring entities to record a plurality of observations pertaining to at least one of: the at least one media stream, the at least two packets, devices associated with at least one of the at least two communicating entities, wherein the at least two monitoring entities comprise at least one of: at least one network entity forwarding the at least one media stream between the at least two communicating entities, the at least one of the at least two communicating entities;

(b) receive, from the at least two monitoring entities, the plurality of observations;

(c) process the plurality of observations to obtain a plurality of pre-processed observations;

(d) analyze the plurality of pre-processed observations to determine a session quality; and (e) send at least one notification to at least one of the at least two monitoring entities, if the session quality satisfies at least one quality criterion, wherein the at least one notification is sent during the streaming media session;

wherein the server arrangement is operable to configure the at least two monitoring entities to record the plurality of observations as a function of time, and wherein the server arrangement is operable to synchronize clocks of the at least two monitoring entities; and wherein when the plurality of observations are recorded as a function of time, the server arrangement is operable to analyze the plurality of pre-processed observations at (d) by:

(i) selecting a time window with respect to a common timeline;

(ii) processing a given set of pre-processed observations that fall inside the time window; and (iii) determining correlated events pertaining to the given set of pre-processed observations.

11. The system according to claim 10, wherein the plurality of observations comprise at least one of:

(i) at least one packet arrival characteristic observed for the at least one media stream and/or the at least two packets, (ii) at least one media rendering characteristic observed for the at least one of the at least two communicating entities during rendering of the at least one media stream, (iii) at least one transport address characteristic observed for the at least one of the at least two communicating entities, (iv) at least one device property observed for the at least one of the at least two communicating entities, (v) at least one environmental property observed for the at least one of the at least two communicating entities.

12. The system according to claim 10, wherein the server arrangement is operable to process the plurality of observations by at least one of: grouping the plurality of observations, filtering the plurality of observations, sampling at least a subset of the plurality of observations, rearranging the plurality of observations in a one-dimensional or multi-dimensional series, correlating the plurality of observations, wherein the server arrangement is operable to process the plurality of observations based upon at least one of:

(i) timestamps associated with the plurality of observations, (ii) measured packet propagation delays occurring between the at least one network entity and the at least one of the at least two communicating entities and/or between at least one transmitting entity and at least one receiving entity from amongst the at least two communicating entities, (iii) markers associated with the at least two packets, the markers being assigned to the at least two packets in a monotonically-increasing manner, (iv) correlation of similar observations occurring within respective timelines of the at least two monitoring entities, (v) correlation of similar observations occurring within respective marker-lines of the at least two monitoring entities, the markers being arranged in an ascending order in the marker-lines.

13. The system according to claim 10, wherein the at least one notification comprises at least one of: statistical data pertaining to the session quality, instructions to perform a corrective action.

14. The system according to claim 10, wherein the server arrangement is operable to select, from amongst a plurality of available servers of the server arrangement, at least one server that is in a proximity of the at least two communicating entities, wherein the at least one server is operable to perform (a) to (e).

15. The system according to claim 10, wherein the server arrangement is operable to:

(f) receive, from the at least one of the at least two communicating entities, a set of parameters associated with the streaming media session, wherein the set of parameters uniquely identifies the streaming media session; and (g) use the set of parameters to identify the at least two packets being communicated during the streaming media session.

16. A system for analyzing a streaming media session between at least two communicating entities, wherein at least one media stream comprising at least two packets is communicated between the at least two communicating entities during the streaming media session, the system comprising a server arrangement that is operable to:

(a) configure at least two monitoring entities to record a plurality of observations pertaining to at least one of: the at least one media stream, the at least two packets, devices associated with at least one of the at least two communicating entities, wherein the at least two monitoring entities comprise at least one of: at least one network entity forwarding the at least one media stream between the at least two communicating entities, the at least one of the at least two communicating entities;

(b) receive, from the at least two monitoring entities, the plurality of observations;

(c) process the plurality of observations to obtain a plurality of pre-processed observations;
(d) analyze the plurality of pre-processed observations to determine a session quality; and
(e) send at least one notification to at least one of the at least two monitoring entities, if the session quality satisfies at least one quality criterion, wherein the at least one notification is sent during the streaming media session;

wherein the server arrangement is operable to configure the at least two monitoring entities to record the plurality of observations as a function of a monotonically-increasing marker associated with the at least two data packets; and wherein the server arrangement is operable to analyze the plurality of pre-processed observations by:
(i) selecting a window with respect to a marker-line associated with a transmitting entity from which the at least two data packets originated and/or a common marker-line;
(ii) processing a given set of pre-processed observations that fall inside the window; and
(iii) determining correlated events pertaining to the given set of pre-processed observations.

17. The system according to claim 16, wherein the marker is a packet-sequence number that is uniquely assigned to each of the at least two packets in a monotonically-increasing manner.

\* \* \* \* \*